July 21, 1964 D. J. CRAWFORD 3,142,049

MEMORY ARRAY SENSING

Filed Aug. 25, 1961 3 Sheets-Sheet 1

INVENTOR
DAVID J. CRAWFORD

BY Melvin P. Williams

AGENT

July 21, 1964 D. J. CRAWFORD 3,142,049

MEMORY ARRAY SENSING

Filed Aug. 25, 1961 3 Sheets-Sheet 3

3,142,049
Patented July 21, 1964

3,142,049
MEMORY ARRAY SENSING

David J. Crawford, Poughkeepsie, N.Y., assignor to International Business Machines Corporation, New York, N.Y., a corporation of New York Filed Aug. 25, 1961, Ser. No. 133,875
5 Claims. (Cl. 340—174)

This invention relates to improved memory sensing, and more particularly, to the improved sensing of bistable storage elements arranged in memory or storage arrays or matrices.

In data processing, it is common to utilize bistable storage elements for storage of data designation manifestations. These elements are frequently arranged in arrays or matrices which may be either planar or three-dimensional in structure. In one type of storage system, the data stored is sensed by pulsing a selected element, and monitoring a sense winding which is coupled to said element to determine whether or not the pulsing of said element produces an output signal. One form of element in common use is the well-known magnetic core. In another type of system, the outputs of a pair of cores are compared, and the information content of the pair is identified by recognizing which core developed a larger output signal. Frequently, the presence of an output pulse, or a dominant one of a pair of signals, is designated to indicate a binary bit ONE, while the opposite condition is taken to indicate that the particular core (or pair) has a ZERO stored therein.

In most magnetic core storage systems, for example, a single sense winding is used for a large number of cores, the conventional sense winding comprising a closed loop, both ends of which are terminated at the input to a sense amplifier. These sense windings have, in their simplest form, certain functional problems which obtain because of the effects of the cores themselves, the effects of other windings on the cores, the effects of other environmental factors.

One of these problems is that the inductive coupling between the sense windings and drive windings, both of which are threaded throughout the matrix, causes the relatively high-powered signals in the drive windings to induce unwanted signals in the sense windings. In order to minimize this adverse effect, the sense windings are caused to thread through the matrix in a zigzag fashion so that there will be approximately as many unwanted induced signals of a first polarity in the sense winding as are induced in the same sense winding with an opposite polarity. This thereby causes an approximate cancellation of these unwanted signals, minimizing the effect of the inductive coupling between the sense and drive windings.

Another problem is capacitive coupling between drive windings and sense windings which also creates the problem of unwanted signals being induced in the sense winding by relatively high-powered signals in the drive windings. This effect is minimized by keeping the sense winding balanced with respect to ground; each sense winding is connected to ground through an impedance device having the same value as the characteristic impedance of the line, at the terminals of the amplifier, so that each point on one-half of the sense winding is at the same line-length distance from ground as a corresponding point on the other half of the sense windings.

The conventional sense winding disclosed above is frequently terminated in its characteristic impedance at the input terminals of the sense amplifier. This is because of the need to minimize reflections which could, in combination with other noise signals, combine to falsely stimulate the amplifier into indicating the sensing of a binary ONE. By providing an impedance across the input terminals of the sense amplifier, which is equal to twice the characteristic impedance of either half of the balanced sense winding, the center of the impedance being grounded, the system not only remains balanced to ground, but the characteristic impedance at the termination of each half of the sense winding will absorb, or prevent reflections.

The type of sense windings, the initial problems, and conventional solutions discussed thus far are all well-known in the art.

Since a sense winding threads a plurality of cores in series, and has throughout its length a distributed capacitance to ground (or other environmental points of potential), the conventional sense winding described above has distributed impedance characteristics nearly identical with those of a transmission line, or delay unit. Therefore, the typical core sense windings has a distributed delay characteristic, the signal delay capability of which is directly proportional to the length of the sense winding. This not only means that a sense winding having a greater total length has a larger delay characteristic, but additionally means that the time to propagate a signal from a core at one point on the sense windings will differ from the time it takes to propagate a signal to the amplifier from a core at a different point on the same sense winding. This, of course, becomes an increasingly important factor as the length of the sense line, or as the number of cores which are coupled to a sense line, increases. In other words, in only the shortest of sense lines is this problem not materially effective in hindering the operation of the storage system.

When a core is sensed, it is like a generator which sees the characteristic impedance looking in each direction. The signal therefore splits, half of it traveling along the sense winding in one direction away from the core, and the other half of it traveling along the sense winding in the other direction away from the core. With respect to a core at one end of the sense winding, one of the half-signals will reach an amplifier terminal nearest to the core before the other signal will reach the farther amplifier terminal, resulting in two signals, instead of one, being sensed by the amplifier. Furthermore, the half-signals from a core in approximately the center of the sense winding will both reach the respective inputs of the differential amplifier in the same length of time. Therefore, the time of appearance of the signal from the center core will fall between the time at which the two separate half-signals from the end core will appear. This being so, it is impossible to strobe or gate the differential amplifier for a single time equal to the pulse width of the core output signals on the sense line; in fact, since a strobing pulse is normally narrower than the signal being gated thereby, it is impossible to determine when the strobing pulse should appear. Additionally, when the two different half-signals are received at separate times, half of the energy appears at the input to the amplifier at one time and the other half of the energy appears at the input to the amplifier at a different time; the amplifier must therefore manifest an output as a result of less input power than would be available if both pulses reached the amplifier at the same time. Alternatively stated, the amplitude of potential difference between the input terminals of the differential amplifier in response to either one of the half-signals will be approximately one-half that which will obtain if both of the half-signals on a sense winding reached respective opposite terminals of the differential amplifier simultaneously. Therefore, amplitude discrimination is difficult, if not impossible. This amplitude problem is further compounded by the fact that the pulsing of a core which is saturated in the direction in which it is pulsed (manifesting a binary ZERO) will tend to generate a small signal equal in amplitude to approximately one-third or one-half the amplitude of a pulse generated from pulsing a core which is saturated in a direction opposite to the direction in which it is pulsed (indicating a binary ONE). That this pulse is of opposite polarity has little significance when the use of a differential amplifier is required, since the differential amplifier will recognize pulses of either polarity. Thus, if the two half-signals corresponding to a ONE are half as large as a full ONE signal, it is nearly impossible to distinguish them from a full sized ZERO pulse which may result from sensing a ZERO in a core approximately midway along the length of the sense winding.

Therefore, the inherent delay characteristics of the conventional sense winding prevents the use of amplitude-discrimination sensing because of the division of amplitude of signals from cores near either end of the sense winding, and seriously inhibits the use of gating or strobing of the differential amplifier to recognize pulses appearing at one particular time, because of the various times at which the positive and negative half-signals of a pulse may appear at the input to the differential amplifier. The use of strobing (or gating) and amplitude discrimination are desirable to assist recognizing ONES and not ZEROES or other noise, as is well known in the core art.

Furthermore, because of the increased effect of these delay characteristics with an increasing line length, it is sometimes necessary to shorten the sense line considerably more than other design criteria would indicate to be preferable, even in systems where the length of the sense line is not limited by noise consideration alone. The need for strobing of the signals, to discriminate from noise, has required use of very short sense windings in prior art devices. This results in the necessity of having more sense amplifiers per given number of cores than would be required if longer sense windings could be used, increasing the cost and complexity of core storage array systems.

These characteristics are also extremely problematical in the two-core-per-bit system wherein the output of two simultaneously pulsed cores are compared to see which of the cores generates the more dominant output signal. If one of the cores in the pair has the dominant signal, this would designate a ONE, whereas, if the other core of the pair of cores has the dominant signal, this would designate a ZERO. Manifestly, each of the half-signals which result from the pulsing of one of the respectively corresponding cores in a system utilizing the prior art balanced-to-ground system reaches the amplifier at the same time that a corresponding half-signal from the other core reaches the input terminals of the amplifier, which means that the differential voltage between the terminals would be split in half in the same way as in the one-core-per-bit system described hereinbefore. Therefore, the problems in the two systems are nearly identical.

A primary object of this invention is to mitigate the adverse effects of delay characteristics of storage sensing lines.

Among other objects of the invention are the following:

To increase the maximum usable length of storage sensing lines to a limit defined only by the noise characteristics thereof;

To prevent the appearance of different modes of the same pulse, at different times, at the amplifier terminals of a balanced storage sensing line;

To eliminate the need for terminating the ends of a balanced storage sensing line in the characteristic impedance of the sensing line at the input to a differential sense amplifier;

To eliminate the division of energy of a sensing signal in a balanced storage sensing line;

To provide a balanced storage sensing line capable of maximum utilization of an amplitude form of signal-to-noise discrimination;

To provide a balanced storage sensing line capable of utilizing a strobescopic-gating form of a signal-to-noise discrimination;

To provide a storage sensing system in which the timing of a strobing signal can be accurately determined;

To provide a self-strobing balanced line magnetic core sense winding system;

Provision of a magnetic core sense winding having maximum suppression of unwanted induced signals, minimum reflection characteristics, and a minimum of propagation time problems;

Provision of a magnetic core sensing system which maintains the nose, reflection, and induced signal characteristics of conventional systems while achieving a freedom from problems of pulse propagation times heretofore unobtainable.

In accordance with the present invention, the balanced-to-ground storage sensing line, such as a magnetic core sense winding, for instance, is provided with terminations to ground midway between the input terminals to a differential sensing amplifier. The terminations to ground are impedance equal to the characteristic impedance of the corresponding one-half of the sensing line. Therefore, each half of the sensing line is terminated to ground through its own characteristic impedance at the end thereof which is farthest away from the input terminals to the differential sensing amplifier.

This invention absorbs the half-signal from a pulsed storage element, which tends to propagate along the sensing line away from the differential amplifier, utilizing only the half-signal which propagates towards the differential amplifier as a manifestation of the data content of the element. Therefore, in any single-core-per-bit magnetic system, for instance, there is only one signal utilized to designate the data content of the core. However, inasmuch as two such terminated sense windings are connected into the same differential amplifier, the same cancellation or spurious noise effects as obtained with the prior art balanced-to-ground sense winding, are still possible. This means that the sense winding not only attains all the advantages of the prior art balanced-to-ground sense winding, but additionally avoids the problems which inhere as a result of time differences between half-signals from a single pulsed core, and the problems which inhere from comparison with such half-signals of full signals representative of a ZERO from a core which was midway along the sense winding and from which both half-signals of a ZERO or a ONE would reach the terminals of the differential sense amplifier simultaneously.

Furthermore, this invention permits the use of a balanced-to-ground sense winding which is essential in a two-core-per-bit system without the undesirable induced noise effects which are inherent in prior art two-core-per-bit systems.

Since the differential timing of half-signals is eliminated, it becomes possible to strobe the input to the sense amplifier to render it effective only at a time within which a ONE bit may appear from a pulsed element, it being blocked to all other signals, thus eliminating the possibility of spurious noise signals being recognized as ONES. Furthermore, it is also possible to limit the minimum amplitude of signal which will be permissibly sensed by the differential amplifier, thus not recognizing any noise signals (such as ZEROS) during the time within which the device may be strobed. This is so because of the fact that all ONES will reach the differential amplifier with the same magnitude, instead of having certain ONES (those which have both half-signals appearing simultaneously) having larger amplitudes than other ONES (those in which the two half-signals arrive at the input terminal at different times).

The foregoing and other objects, features and advantages of the invention will be apparent from the following more particular description of preferred embodiments thereof, as illustrated in the accompanying drawings.

In the drawings:

FIG. 1 is a schematic illustration of the prior art balanced-to-ground magnetic core sense winding, FIG.

1*a* illustrating a simplified sense winding and FIG. 1*b* illustrating the delay line circuit which is equivalent to the sense winding circuit of FIG. 1*a*;

Figures 1A, 1B:
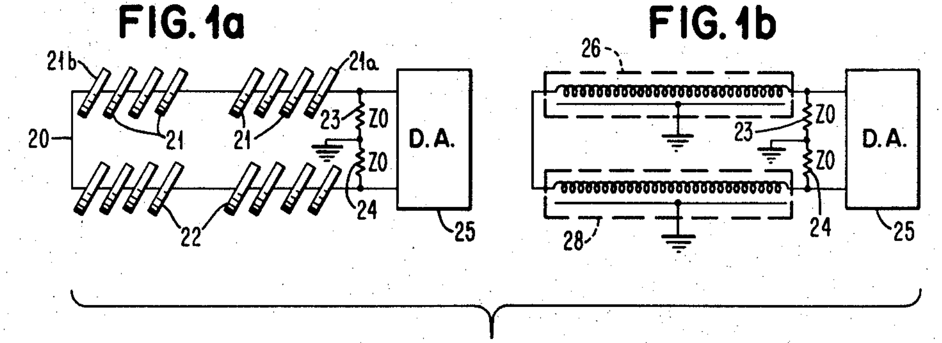

Referring to FIG. 1*a*, a prior art balanced-to-ground sense winding 20 passes in a first direction through a plurality of cores 21 which may be well-known toroids (shown in FIG. 1*a* in an edge view), and through another plurality of cores 22 in a second direction. The two ends of the sense winding 20 are each connected to ground through an impedance 23, 24, which equals the characteristic impedance of the entire sense winding 20. The characteristic impedance is used in preference to some other value of impedance since this will absorb the wave which propagates along the sense winding 20, thereby preventing reflections which would propagate backwardly toward the core from which they came, and eventually, to the other input terminal of the amplifier 25. Each end of the sense winding 20 is also applied to respectively corresponding input terminals of a differential amplifier (D.A.) 25 of any well-known type.

FIG. 1*b* illustrates the fact that the sense winding 20 and cores 21, 22 in the circuit of FIG. 1*a* are, together, equivalent to two delay lines 26, 28, connected together at one end, the other ends of which are each connected to ground by the respectively corresponding impedances 23, 24 equal to the characteristic impedance of either of the lines, this characteristic impedance being the same for each of the delay lines 26, 28.

Referring to the core **21*a*** in FIG. 1*a*, one of its half-signals will reach the upper input terminal of the differential amplifier 25 without any delay, while the other half-signal will propagate to the left through the other ones of the cores 21 (which represent the delay, such as the delay line 26 in FIG. 1*b*), and will then propagate to the right through the cores 22 (which corresponds to the delay line 28 in FIG. 1*b*) to the lower input terminal of the differential amplifier 24. Thus, this second half-signal is delayed by a time commensurate with the length of the both delay lines 26, 28 in FIG. 1*b* before it reaches the lower terminal of the differential amplifier 25. Therefore, one of the half-signals will reach the differential amplifier substantially earlier than the other half-signal. Contrariwise, the half-signals from the core **21*b* each travel through substantially the same length of delay line, the half-signal propagating to the left through the cores 21 is delayed approximately seven-eighths of the total delay capability of the delay line 26** in FIG. 1*b*, whereas the half-signal propagating to the right through the cores 22 is delayed the full amount of the delay characteristic of delay line 28 in FIG. 1*b*. Therefore, the signal output from the core **21*b* is impressed across both terminals of the differential amplifier 25 and is twice as great as the signal output of the core 21*a* for which the half-signals reach the input terminals of the differential amplifier at different times. Furthermore, a ZERO signal from the core 21*b*, although only one-half to one-third as great as the initial combination of the half-signals resulting from a ONE in core 21*a*, does comprise a signal of approximately the same strength as are either of the half-signals from the core 21*a* when they reach the amplifier terminals. Since the differential amplifier responds to both polarities, it is difficult or impossible for the differential amplifier to distinguish between the ZERO output from core 21*b* and a ONE output from core 21*a***.

Figure 2:
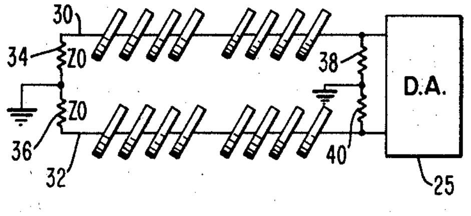
PRIOR ART FIG. 2
FIG. 2 is a simplified schematic diagram of a first embodiment of the invention wherein both ends of a balanced-to-ground magnetic core sense winding are terminated to ground through characteristic impedances.

FIG. 2 shows a simplified embodiment of the present invention wherein a pair of individual sense windings 30, 32 are each terminated at both ends by respectively corresponding characteristic impedances 34, 36 and 38, 40. Each sense winding 30, 32 is applied to a respectively corresponding one of a pair of input terminals to a differential amplifier 25, which may be any well-known differential amplifier, as are those shown in FIGS. 1*a* and 1*b*. In FIG. 2, an output signal from any particular core will split as before, there being a half-signal propagating to the right and a half-signal propagating to the left. However, all half-signals which propagate to the left are absorbed in the corresponding characteristic impedance and do not affect the differential amplifier 25. On the other hand, all half-signals propagating to the right will cause a response at a corresponding one of the input terminals to the differential amplifier 25. Since the end of each of the sense windings 30, 32 farthest from the amplifier is terminated in its characteristic impedance 34, 36, respectively, any waves which propagate towards them will be absorbed by the characteristic impedance and no reflection will occur. Therefore, it is no longer necessary to maintain the value of the impedances 38, 40, as equal to the characteristic impedance of the lines 30, 32.

Figure 3:
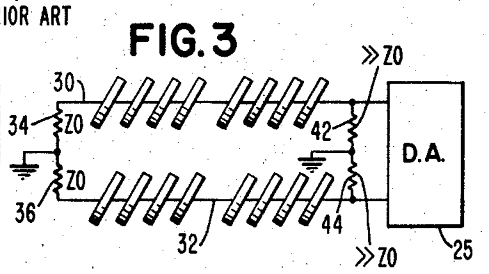
FIG. 3 is a simplified schematic diagram of another embodiment of the invention wherein the amplifier end of a balanced-to-ground sense winding is terminated in an impedance much larger than the characteristic impedance and the other end is terminated to ground by the characteristic impedance.

FIG. 3 illustrates the fact that impedances 42, 44 at the differential amplifier end of the lines 30, 32 may be made much greater than the characteristic impedance of these lines, since any waves reflected by the differential amplifier 25 (together with the high impedances 42, 44) will be absorbed when they reach the opposite end of the lines 30, 32 by the characteristic impedances 34, 36 at the non-amplified end. The circuit of FIG. 2 will supply a signal to each terminal of the differential amplifier, which is one-half of the amplitude of the entire signal generated by any of the cores on the windings, 30, 32 because each half-signal will propagate in an opposite direction and the differential amplifier will respond only to the half-signals which reach the input terminals of the differential amplifier 25. Stated alternatively, there is a voltage division effect between the characteristic impedances 34, 38 with respect to signals generated on the sense winding 30; similarly, signals generated on the sense winding 32 will be affected by a voltage division effect of the characteristic impedances 36, 40. Contrariwise, since the impedances 42, 44 (FIG. 3) are much greater than the impedances 34, 36, there is only a small voltage division effect as to each of the lines 30, 36. In other words, most of the potential of a signal developed on the line 30 will be developed across the impedance 42 rather than the characteristic impedance 34 and most of the amplitude of the signal developed on line 32 will be developed across the impedance 44 rather than the characteristic impedance 36. Therefore, it is possible to eliminate the delay line characteristics of the sense windings 30, 36 without the amplitude of signals generated on windings 30, 32 being divided in half, by utilizing high impedances at the input terminals to the differential amplifier 25.

With each of the sense windings 30, 32 being terminated in its own characteristic impedances 34, 36, they may appear at first glance to be separate sense windings and, therefore, no different than any other individual sense winding. However, the sense windings 30, 32 are *applied as a pair* to the corresponding input terminals of a differential amplifier 25. This means that induced noise effects which would be of the same polarity on each of the windings 30, 32 will cancel at the input to the differential amplifier (which responds only to differences in potential between the lines 30, 32), as is the case in the prior art balanced-to-ground sense winding 20 shown in FIG. 1*a*. Therefore, this invention combines the advantages of individual sense windings with the advantages of the balanced-to-ground sense winding of the prior art.

Figure 4:
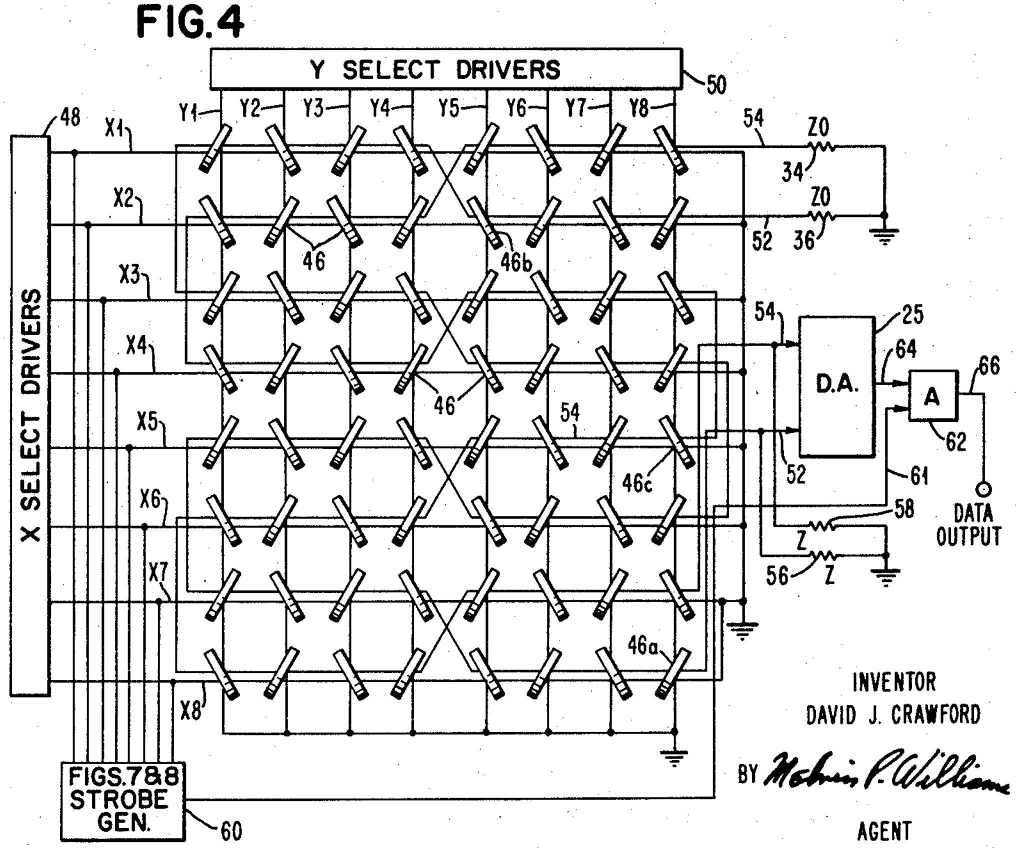
FIG. 4 is a schematic diagram illustrative of the application of either of the embodiments of FIG. 2 or FIG. 3 in an eight-by-eight magnetic core memory array, including strobing means for discriminating the signals sensed in the core.

In FIG. 4 is shown an eight-by-eight magnetic core storage array in which any one of a plurality of cores 46 may be independently sensed in response to coordinate energization, by the X SELECT DRIVER 48 and the Y SELECT DRIVER 50, of a corresponding one of the "X" drive lines X1–X8 and "Y" drive lines Y1–Y8. For instance, the core 46*a* is sensed by simultaneous energization of the winding X8 and the winding Y8. Similarly, core 46*b* could be sensed by simultaneous energization of winding X2 and winding Y5. It will be observed that core 46*a* is substantially closer to the input terminals of the differential amplifier 25 than is the core 46*b*. Therefore, signals from the core 46*a* reach the differential amplifier 25 at a time substantially in advance of the time when signals from the core 46*b* reach the differential amplifier 25. Both cores 46*a* and 46*b* are threaded by the same sense winding 52, which is shown wired in the crisscross fashion so as to reduce inductive pickup as a result of drive current flowing in either the drive windings X1–X8 or the drive windings Y1–Y8, or any other drive windings which may be utilized. The winding 52 is terminated in the characteristic impedance 36. Other cores (for instance, core 46*c*) are threaded by a drive winding 54, which terminates in the characteristic impedance 34. The sense winding 52 may be terminated at the differential amplifier in an impedance 56, which could be either a characterisic impedance, as is the characteristic impedance 38 in FIG. 2, or it could be some other impedance, for instance, an impedance much greater than the characteristic impedance, as is the impedance 42 in FIG. 3. Similarly, the sense winding 54 is terminated in a corresponding impedance 58 at the input to the differential amplifier 25.

Figure 7:
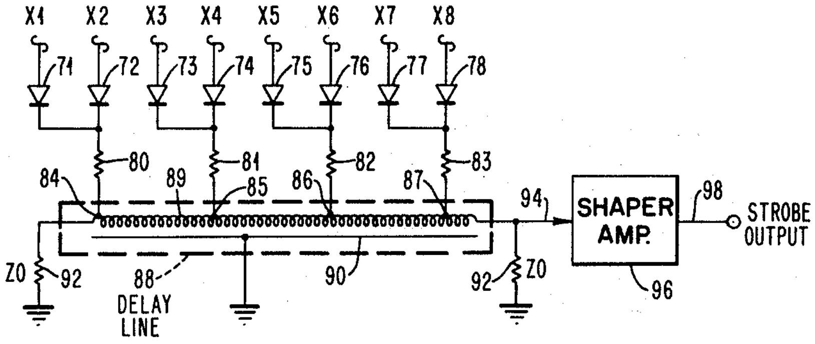
FIG. 7 is a schematic diagram of a first embodiment of a strobing means in accordance with the present invention.
Figure 8:
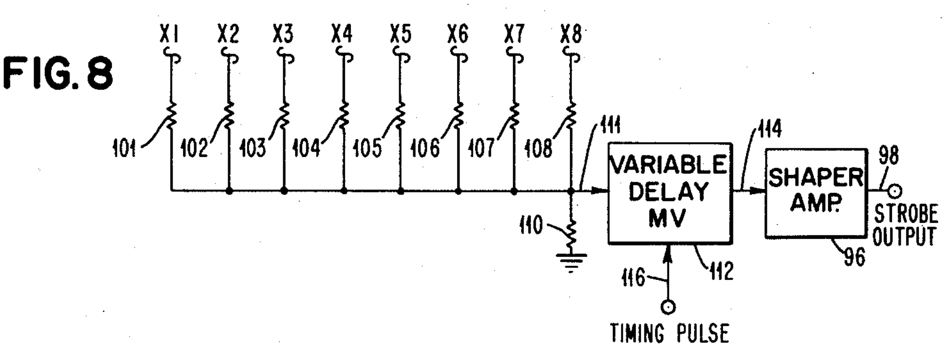
FIG. 8 is a second embodiment of a strobing means in accordance with the present invention.

In order to gate signals from cores which are different distances away from the differential amplifier 25, a strobe generator 60 provides a signal on a line 61 to gate an AND circuit 62 so as to pass the output of differential amplifier 25 on a line 64 to a data output line 66 only at a time within which cores threaded by selected X windings could generate signals for sensing by the differential amplifier 25. All other outputs from the differential amplifier 25 would reach the AND circuit 62 at a time within which it would be blocked due to a lack of signal on the line 61. Therefore, only proper signals from selected cores will pass to the data output line 66. The strobe generator 60 may be of either of two forms which are shown in FIGS. 7 and 8, or any other time-sensitive strobe generator of a known type. The time at which the output of the strobe generator is available is determined by the one of the winding X1–X8 which excites it: X1 will cause a strobe signal on line 61 which is much later than that caused by X8.

Referring to FIG. 7, each of the drive lines X1–X8 is connected to a respectively corresponding diode 71–78, the cathodes of which are connected in pairs to associated resistors 80–83. Each of the resistors 80–83 is connected to a corresponding tap 84–87 on a delay line 88 which comprises series inductance 89 and shunt capacity 90 in the well-known manner. The delay line 88 is terminated in its characteristic impedance 92 at either end. The output of the delay line is connected by a line 94 to a shaper amplifier 96 which provides a strobe output signal on a line 98. Referring to FIGS. 4 and 7, the X1 and X2 lines will drive cores which are within the same range of distance from the driver amplifier and, therefore, will cause signals on the sense windings 52, 54, which appear at the driver amplifier 25 within corresponding time limits. For instance, if the Y1 drive line were energized, a signal would reach the driver amplifier at the same time which one of the X1 or the X2 windings was simultaneously energized. Similarly, if the Y8 drive line were energized, the signal would reach the driver amplifier on one of the lines 52, 54 at a later time than would obtain when the Y1 line was energized, but still it would be immaterial as to the timing of the signal whether the X1 or X2 line were energized. The difference between X1 and X2 is merely that a different one of the cores will be driven and a different one of the sense lines 52, 54 will have the signal generated thereon. Therefore, in FIG. 7, the drive line X1 and the drive line X2 are connected together through the resistor 80 to the tap 84 and, similarly, each successive pair of drive lines are connected through the corresponding resistor 81, 83 to a related tap 85–87 on the delay line 88. In this fashion, the strobe signal to the AND circuit 62 in FIG. 4 will be later if caused by a signal on one of the drive windings X1, X2 (for instance, in driving out the core 46*b*) than it would be if the drive windings X7 or X8 were energized (for instance, in driving out the core 46*a*). The shaper amplifier 96 in FIG. 7 could be any amplifying means which has a fairly well-defined duration of output signal, such as a well-known single shot (or monostable multivibrator). The incremental length of the delay line 88 should be such that the leading edge of the strobe output signal on line 98 would coincide with the time at which the drive winding Y1 could drive cores out of rows controlled by the respective pairs of drive windings X1, X2, or X3, X4, or X5, X6, or X7, X8. The strobe output signal on line 98 should be of sufficient duration so as to be still present at a time in which the drive winding Y8 could cause an output signal in combination with either of the ones of the four associated pairs of drive windings X1–X8. In this manner, the AND circuit 62 (FIG. 4) would be gated in response to signals on one of the drive windings so as to accommodate any core driven thereby.

An alternative form of strobe generator is illustrated in FIG. 8, wherein each of the drive windings X1–X8 is connected to a corresponding resistor 101–108. The resistors 101–108, together with a common input resistor 110, control the pulse width of a variable delay multivibrator 112, which will determine the time at which the shaper amplifier 96 will be turned on by a signal on a line 114 and thereby derive the strobe output signal on the line 98. A timing signal is applied on a line 116 to the multivibrator 112 to start the timing thereof, and the duration of the output signal on line 114 will be determined by the voltage division of the signal on one of the X lines X1–X8 between the respectively corresponding resistor 101–108 and the common input resistor 110. The more positive the voltage on the line 111, the greater will be the delay between the input and output of the variable delay multivibrator 112. Assuming the lines X1–X8 to have signals of positive polarity thereon, a larger resistance value in one of the resistors 101–108 will yield a shorter delay and a smaller resistance value in the resistors 101–108 will yield a longer delay, since this will permit the line 111 to be electrically farther from ground than would a larger resistance 101–108. Therefore, the resistors 101 and 102 will be smaller than each successive pair of resistors 103–108, etc. Since the time delay required for strobing the signals resulting from drive currents on drive winding X1 is the same as winding X2, these two drive windings are connected through resistances 101, 102, having the same value. Alternatively, isolating diodes (such as diodes 71–78 in FIG. 7) could be utilized to connect the lines X1–X8 through only four resistors, adjacent pairs of lines being connected to the same resistance. The variable delay multivibrator 112 may be a cathode coupled multistable multivibrator of the type shown in FIG. 5.12, page 170, of Chance et al., Waveforms (Radiation Laboratory Series, vol. 19), New York, McGraw-Hill, 1949.

Figure 5:
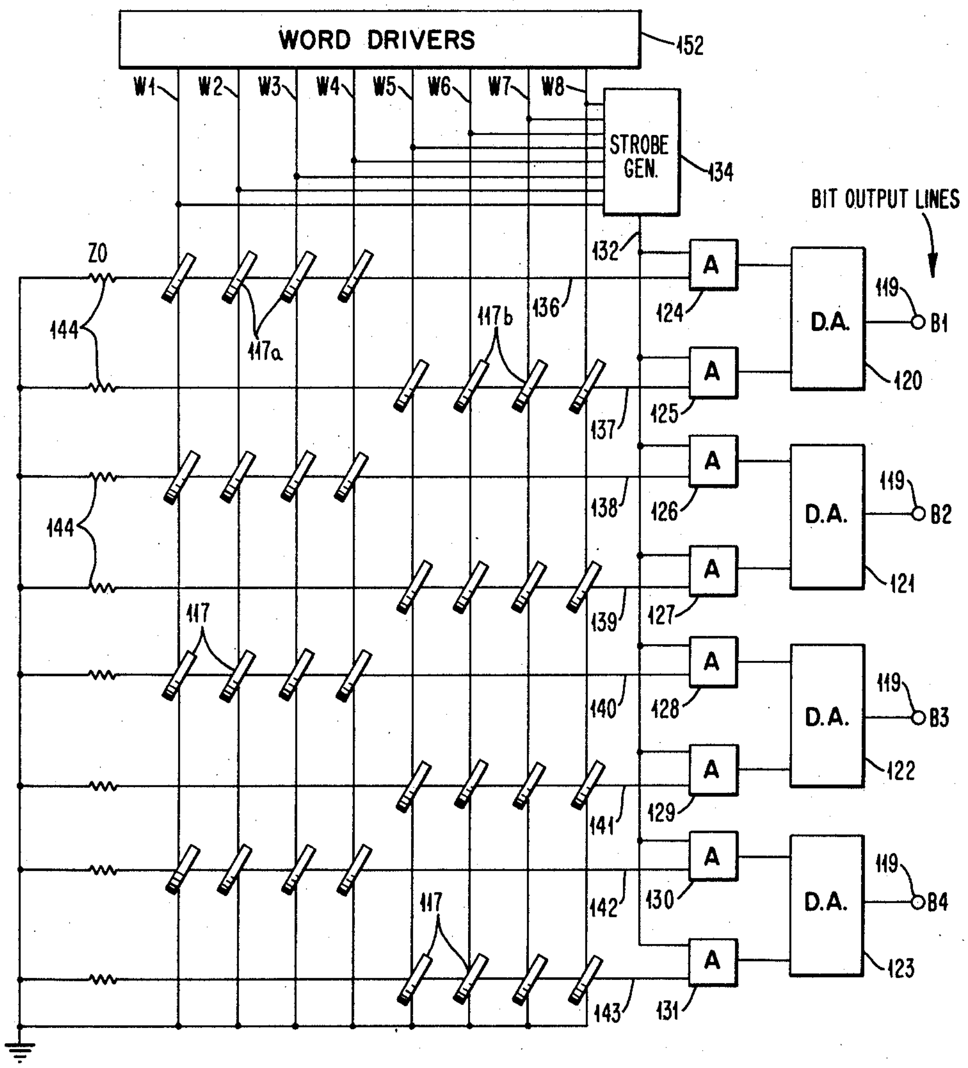
FIG. 5 is a schematic diagram of a four-by-eight word-oriented magnetic core storage matrix utilizing one-core-per-bit in which the sense windings are terminated in their characteristic impedances in accordance with the present invention.

Referring now to FIG. 5, a four-by-eight word-oriented magnetic core storage matrix utilizing one core per bit of storage is shown comprised of eight words, each corresponding to a vertical drive winding W1–W8, each word containing four cores 117, each core corresponding to a different bit (or data designation). Four differential amplifiers 120–123 are adapted to receive input signals from corresponding AND circuits 124–131. All of the AND circuits 124–131 are gated by the strobe signal on the line 132 which is supplied by a strobe generator 134, which may be similar to either of the types previously described with respect to FIGS. 7 and 8, or any other suitable type. Each of the AND circuits is also responsive to a corresponding sense winding 136–143, the opposite ends of which are each terminated in the characteristic impedances 144. In FIG. 5 the differential amplifiers have some internal impedance to ground but, as before described, the nature of this impedance is not critical to the invention inasmuch as the opposite end of each of the sense windings 136–143 is terminated in the characteristic impedance. Therefore, no impedances are shown at the input to the amplifiers. The cores **117*a* which are all threaded by the sense winding 136 all correspond to a first data bit (or data designation) and, similarly, the cores 117*b* threaded by the sense winding 137 all correspond to the same data bit (or data designation). It will be seen that the cores for Word 1 through Word 4 are threaded by the sense winding 136, whereas the cores for Word 5 through Word 8 are threaded by the sense winding 137. Thus, the two sense windings together comprise a pair which correspond to the sense windings 30 and 32 in FIG. 2. Similarly, the sense windings 138 and 139 contain all the cores for a second data bit for all the words Word 1–Word 8, the sense windings 140 and 141 correspond to all of the cores for a third data bit and the sense windings 142, 143** correspond to all of the cores for a fourth data bit.

In operation, a particular word would be selected for sensing and the corresponding one of the drive windings W1–W8 would be energized by a corresponding one of a plurality of word drivers 152 so as to drive out a particular column of cores. Certain of the cores may respond, whereas others will not, the combination of responses indicating the data content thereof. Thus, if Word 1 were selected, there would be a signal on the drive line W1, which would tend to drive out the cores threaded thereby, each of which may send a half-signal in both directions (that is, to the right and to the left) on the corresponding one of the sense windings 136, 138, 140, 142. The half-signals which propagate to the left will each be absorbed in the corresponding characteristic impedance 144 and have no effect on the system. Contrariwise, the half-signals which propagate to the right will reach corresponding AND circuits 124, 126, 128, 130 at a time coincident with a strobe signal on the line 132. Therefore, signals will be applied to respective input terminals of all of the driver amplifiers 120–123 so as to provide bit output signals on the lines 119. At the same time that the signal on drive winding W1 pulses each of the related cores, it also energizes the strobe generator so as to initiate the strobe signal as before described. (FIG. 5 has been simplified by leaving off the drive winding used for storing data in the cores; any well-known system for storing is commensurate with this invention.)

Figure 6:
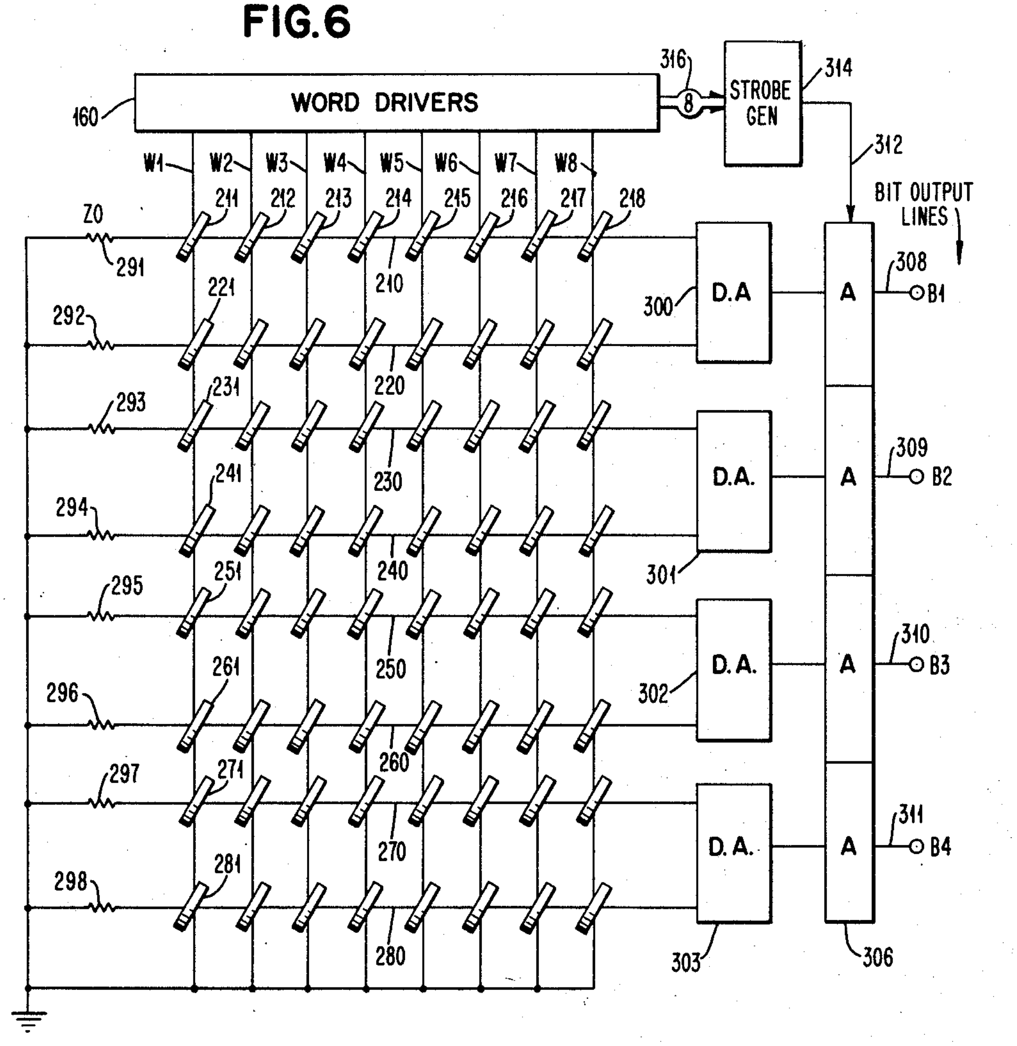
FIG. 6 is a schematic diagram of a four-by-eight word-oriented magnetic core storage matrix utilizing the two-core-per-bit principle in which the sense windings are terminated in their characteristic impedances in accordance with the present invention.

In FIG. 6 is shown a four-by-eight word-oriented magnetic core storage matrix utilizing the two-core-per-bit system. A plurality of word drivers 160 each corresponds to a drive line W1–W8; each of the drive lines passes through eight cores, there being four different related pairs. For instance, drive winding W1 passes through cores 211, 221, 231 . . . 281. Also provided are a plurality of sense windings 210, 220, 230 . . . 280, each of which is terminated to ground through a respective characteristic impedance 291–298; each sense winding passes through a like core corresponding to each of the drive windings W1–W8; for instance, sense winding 210 passes through each of the cores 211, 212, 213 . . . 218. The sense windings and cores are related to each other in pairs, a related pair being connected to respective terminals of a corresponding amplifier 300–303, the outputs of which each pass through a respectively corresponding one of a plurality of AND circuits 306 to related output terminals 308–311. The AND circuits 306 are each gated by a strobe signal on a line 312 from a strobe generator 314, which may be of either type shown in FIGS. 7 and 8, or any suitable type. The strobe generator 314 receives a plurality of individual inputs over a trunk of eight lines 316. The lines 316 connect the strobe generator 314 to each of the word driver lines W1–W8 in the same manner as in FIG. 5. The arrangement of the AND circuits 306 in FIG. 6 illustrates the fact that the strobe may gate the output of the differential amplifiers (as in FIG. 4) in contrast with the strobing of the inputs of the differential amplifiers (as in FIG. 5). The manner of use of this strobe generator and strobe signal is not important to this invention, the manner of strobing being a matter of design criteria that may be selected in order to suit the unique requirements of a particular embodiment of the invention.

In FIG. 6, each pair of sense windings which is connected to the input terminals of a differential amplifier relates to the same particular bit or data designation. Thus, the sense windings 210 and 220 may relate to a data bit B1, the sense windings 230 and 240 may relate to the data bit B2, etc. In operation, when a particular drive winding is energized, one core of each of the pairs of cores threaded by that drive winding generates a signal which is of greater amplitude than the other one of the cores. For instance, if the drive winding W1 were energized, either the core 211 or the core 221 will have a signal which is stronger than the other, respectively, causing the differential amplifier to respond a greater amount to the sense winding 210 or to the sense winding 220. Thus the stronger signal determines the net polarity, and therefore the data designation significance of the output signal.

Each of the circuits in FIGS. 4–6 are shown with the differential amplifier gated (either at the input or the output) to illustrate utilization of this invention to its fullest advantage. Although not shown, the differentil amplifiers also may be made amplitude responsive so as to respond only to signals, which are within a given range of magnitude. Since the undesirable delay line effects have been eliminated by means of the present invention, the amplitude of all signals generated by a sensed core (in a one-core-per-bit system) will be approximately the same. This makes it possible to discriminate between spurious signals from cores having ZEROES stored therein, and other noise signals, by means of amplitude discrimination so as to recognize only signals which have a magnitude equal to the magnitude of a signal from a core which had a ONE stored therein.

Although the embodiments shown herein have been limited in size to relatively few cores, it should be understood that the greatest advantages of the invention are obtained in larger arrays of cores. Similarly, any form of differential amplifier, or any particular strobe generator which will provide for gating the particular signals, may be used in any specific embodiment.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a storage device of the type having a plurality of pulse responsive bistable storage elements arranged in groups, comprising:
  a plurality of sensing lines, one for each of said groups, each sensing line responsive to all of the elements in the corresponding group, the combination of each sensing line and its associated elements having a determinable characteristic impedance with respect to an environmental point of reference, such as ground;
  a plurality of differential amplifiers, each respectively corresponding to a pair of said sensing lines, each of said differential amplifiers having a pair of input terminals, each connected to a first end of one of the respectively corresponding sensing lines;
  characterized by the fact that there is provided a termination from the second end of each of said sensing lines to said environmental point of reference, each of said terminations being substantially identical to the characteristic impedance of the respectively corresponding sensing line.

2. In a storage device in which a plurality of storage elements are arranged in groups, each group being operatively connected to a common sensing line, each sensing line together with the elements connected thereto having a determinable characteristic impedance with respect to an environmental point of reference, such as ground, the improved sensing system, comprising:
  a plurality of sensing lines;
  a plurality of storage elements for each of said sensing lines, each of said storage elements being connected to the corresponding sensing line;
  a plurality of differential amplifiers, each of said differential amplifiers corresponding to a pair of said sensing lines, a first end of each sensing line in a pair being connected to a respective one of a pair of input terminals of the related differential amplifier;
  and a plurality of impedances, one for each of said sensing lines, each substantially equal to the characteristic impedance of the respectively corresponding sensing line and elements connected thereto, each of said impedances connecting a second end of the corresponding sensing line to said environmental point of reference.

3. In a magnetic core storage device having a plurality of magnetic cores arranged in groups, a sensing device, comprising:
  a plurality of sense windings, one for each of said groups, each sense winding passing through all of the cores in the corresponding group, the combination of each sense winding and its associated cores having a determinable characteristic impedance with respect to an environmental point of reference, such as ground,
  a plurality of differential amplifiers, each respectively corresponding to a pair of said sense windings, each of said differential amplifiers having a pair of input terminals, each connected to a first end of one of the respectively corresponding sense windings;
  characterized by the fact that there is provided a termination from the second end of each of said sense windings to said environmental point of reference, each of said terminations being substantially identical to the characteristic impedance of the respectively corresponding sense winding.

4. In a magnetic core storage device in which a plurality of magnetic cores are arranged in groups, each group being threaded by a common sense winding, each sense winding together with the cores threaded thereby having a determinable characteristic impedance with respect to an environmental point of reference, such as ground, the improved sensing system, comprising:
  a plurality of sense windings;
  a plurality of magnetic cores for each of said sense windings, each of said cores having the corresponding sense winding passing through an aperture thereof;
  a plurality of differential amplifiers, each of said differential amplifiers corresponding to a pair of said sense windings, a first end of each sense winding in a pair being connected to a respective one of a pair of input terminals of the related differential amplifier;
  and a plurality of impedances, one for each of said sense windings, each equal to the characteristic impedance of the respectively corresponding winding and cores, each of said impedances connecting a second end of the corresponding sense winding to said environmental point of reference.

5. In a magnetic core storage device in which a plurality of magnetic cores are arranged in groups, each core being switchable between a data-designating state and a non-data-designating state, each group being threaded by a common sense winding, each sense winding together with the cores threaded thereby having exhibiting the characteristics of a transmission line including a determinable characteristic impedance with respect to an environmental point of reference, such as ground; the improved sensing system, comprising:
  a plurality of magnetic cores arranged in groups, each core in a group corresponding to a similar core in each other group, the corresponding similar cores in different groups forming sets;
  a plurality of sense windings, one for each of said groups;
  a plurality of switching means, one for each of said sets, each operable to switch all of the cores in a corresponding set from said data designating state to said non-data designating state, each of said cores, in changing from said data designating state to said non-data designating state, manifesting a signal in the respectively corresponding one of said sense windings;
  a plurality of differential amplifiers, each corresponding to a pair of said sense windings, each having a pair of input terminals, one end of each sense winding in a pair being connected to a respectively corresponding one of the input terminals of the corresponding differential amplifiers, each terminal of said amplifiers responding to signals manifested by corresponding cores at different times, said different times being proportional to line length of the related sense winding between each core and the respective amplifier, each core in a set being substantially the same line length distance from the amplifier corresponding thereto;
  a plurality of impedances, one for each of said sense windings, each equal to the characteristic impedance of the respectively corresponding winding and cores, each of said impedances connecting a second end of the corresponding sense winding to said environmental point of reference;
  and gating means for said differential amplifiers, said gating means being operative to gate signals from each of said sense windings through the respectively corresponding one of said differential amplifiers, said gating means being differentially responsive to different ones of said driving means so as to gate said differential amplifiers at corresponding different times.

(References on following page)

References Cited in the file of this patent

UNITED STATES PATENTS

| | | |
|---|---|---|
| 2,732,542 | Minnick | Jan. 24, 1956 |
| 2,900,624 | Stuart-Williams et al. | Aug. 18, 1958 |
| 2,911,631 | Warren | Nov. 3, 1959 |
| 3,015,809 | Myers | Jan. 2, 1962 |
| 3,034,107 | Knowles | May 8, 1962 |

FOREIGN PATENTS

| | | |
|---|---|---|
| 873,164 | Great Britain | July 19, 1961 |

OTHER REFERENCES

Publication I, IBM Technical Disclosure Bulletin, vol. 2, No. 4, December 1959; page 125, No. 151.